US008007620B2

(12) United States Patent
Cushing et al.

(10) Patent No.: US 8,007,620 B2
(45) Date of Patent: Aug. 30, 2011

(54) TRANSLUCENT, FLAME RESISTANT COMPOSITE MATERIALS

(75) Inventors: Daniel W. Cushing, Covington, WA (US); Eugene A. Jackson, Renton, WA (US); Keith H. Novak, Shoreline, WA (US); David N. Dunn, Marysville, WA (US); Gregory R. Bell, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/577,618

(22) Filed: Oct. 12, 2009

(65) Prior Publication Data
US 2010/0059900 A1     Mar. 11, 2010

Related U.S. Application Data

(62) Division of application No. 10/707,612, filed on Dec. 24, 2003, now abandoned.

(51) Int. Cl.
*B29C 65/18* (2006.01)
*B32B 27/04* (2006.01)
*B32B 27/12* (2006.01)

(52) U.S. Cl. .............. 156/245; 156/308.2; 156/311; 156/312

(58) Field of Classification Search .......... 156/245, 156/267, 308.2, 309.6, 311, 312; 264/257, 264/271.1, 279.1, 320, 348
See application file for complete search history.

(56) References Cited

U.S. PATENT DOCUMENTS

| | | | |
|---|---|---|---|
| 3,434,914 A * | 3/1969 | Sterman et al. ............. 442/71 |
| 5,014,755 A | 5/1991 | Bompard et al. |
| 5,039,571 A | 8/1991 | Vogelesang et al. |
| 5,120,597 A | 6/1992 | Takimoto et al. |
| 5,258,445 A | 11/1993 | Sperk, Jr. et al. |
| 5,319,003 A | 6/1994 | Gomez et al. |
| 5,360,129 A | 11/1994 | Lee |
| 5,398,889 A | 3/1995 | White et al. |
| 6,242,638 B1 | 6/2001 | Lin et al. |
| 6,673,872 B2 | 1/2004 | van Beek et al. |
| 2004/0219855 A1 | 11/2004 | Tsotsis |

FOREIGN PATENT DOCUMENTS
JP     08193623     7/1996

OTHER PUBLICATIONS
Definition of "nonwoven fabric" Complete Textile Glossary, Celanese Acetate, 2001 (no month), 3 pages.
Definition of "fabric" Complete Textile Glossary, Celanese Acetate, 2001 (no month), 3 pages.

* cited by examiner

*Primary Examiner* — Michael A Tolin
(74) *Attorney, Agent, or Firm* — Yee & Associates, P.C.

(57) ABSTRACT

A translucent composite material that can be used in various airplane interior applications that allows sufficient light transmissivity while preferably meeting Federal Aviation Administration (FAA) flammability requirements for overhead materials in the cabin of a commercial aircraft. The material also meets FAA standards regarding vertical burn, smoke emissions tests, and toxic fume emissions tests. The composite material is formed by laminating long glass fibers and (PPSU) into a composite sheet under controlled heat and pressure. The composite sheet is then cut, bent or thermoformed to form the desired part. The parts formed are available for a wide variety of uses within the passenger cabin of a commercial aircraft. The long glass fibers may be unidirectional or weaved into a glass cloth like material. While preferably formed for airplane interior applications, these components may also be used in other aerospace or non-aerospace applications.

8 Claims, 7 Drawing Sheets

TRANSLUCENT, FLAME RESISTANT COMPOSITE MATERIALS

This application is a divisional of application Ser. No. 10/707,612, filed Dec. 24, 2003, now abandoned.

BACKGROUND OF INVENTION

The present invention generally relates to composite materials and more specifically to translucent, flame resistant composite materials that may be used in aircraft interiors and other aerospace applications.

The interiors of commercial aircraft are typically formed with a large number of components in many shapes and forms that have both practical and aesthetic functions. It is also highly desirable that certain of these components be translucent, i.e. that these panels should allow light to pass through them for various purposes (i.e. be transmissive). Examples of translucent interior components may include but are not limited to partitions, windscreens, class dividers, privacy curtains, sidewalls, ceilings, doorway linings, lighting fixtures, backlit control panels, stow bin doors, tray tables, proximity lighting, and window bezels.

Besides translucency, materials used in aircraft interior components must meet strict Federal Aviation Administration (FAA) requirements in terms of flammability resistance properties (FAR 25.853 and Appendix F), including heat release, vertical burn, smoke emissions tests, and toxic fume emissions tests. For example, the standard test method for heat release is the Ohio State University heat release test as found in FAR 25.853 Part IV.

Prior art plastic materials used in commercial aircraft could not typically achieve the combination of a desired transmissivity of light while meeting FAA requirements in terms of flammability resistance properties (FAR 25.853 and Appendix F), vertical burn, smoke emissions tests, and toxic fume emissions tests. As such, interior components have typically been made of non-translucent (opaque), or marginally translucent plastic materials that meet these FAA requirements.

It is highly desirable to form a composite material that can be post-processed to form substantially translucent interior components for use in commercial aircraft cabins that meets or exceeds FAA requirements as described above. It is also desirable that such a material be low cost in terms of manufacture and raw material costs. It is also highly desirable that such a composite material be low weight and easily conformable to form a potentially limitless variety of shapes and configurations for these components.

SUMMARY OF INVENTION

The present invention discloses composite materials that meet or exceed the FAA requirements in terms of flammability resistance properties (FAR 25.853 and Appendix F), including heat release, vertical burn, smoke emissions tests, and toxic fume emissions tests. The composite materials are post-processed to form various translucent components used throughout the interior of a cabin on an aircraft that allow transmissivity of desirable amounts of light.

The composite material consists of long glass fibers encapsulated within a polyphenylsulfone (PPSU) substrate material. The long glass fibers are preferably configured within a loose weave or may alternatively be unidirectional in nature so long as the fibers meet the requirements for light transmission and flammability.

The composite material is formed as a two-layer or three-layer system. In the two-layer system, the glass fibers are laminated to one side of the PPSU substrate. In a three-layer system, the glass fibers are sandwiched between and laminated to two layers of the PPSU substrate. The preferred manufacturing processes identified for forming the two-layer or three-layer panels a thermal pressing process and a continuous fiber impregnation process. The composite material is cut and thermoformed or bended to the shape of the final part.

Other objects and advantages of the present invention will become apparent upon considering the following detailed description and appended claims, and upon reference to the accompanying drawings.

DETAILED DESCRIPTION

The present invention describes the formation of composite materials that are ideally suited for use as translucent components for various devices contained within cabin areas of commercial aircraft due to their light transmissivity properties and flame retardancy. As one of ordinary skill recognizes, however, the composite materials may be used in other applications not directly related to commercial aircraft. For example, the composite materials could find usage in other aerospace applications or even in non-aerospace applications such as automotive applications.

FIGS. 1-14 illustrate various views of an interior, or cabin region 12, of a commercial aircraft 10. The aircraft 10 has a wide variety of translucent components 14 that are traditionally found within the cabin region 12 that are formed from a novel composite material 70 that is the subject of the present invention.

The components 14 formed are light transmissive to allow for a pleasing glow or to allow for use as primary lighting within the cabin region 12.

The materials also meet flammability standards. For example, the standard test method for heat release is the Ohio State University heat release test as found in FAR 25.853, Part IV, in which the maximum allowable average heat release for interior panels contained with the cabin area of commercial airlines does not exceed 65 kw/m$^2$ as measure at a two minute interval and for a peak rate at five minutes. This is also known in the industry as the 65/65 standard (peak heat release/total heat release).

The translucent components 14 also meet Federal Aviation Association (FAA) certification requirements for materials used overhead in the passenger cabin area 12. These certification requirements state that the composite material 70 must not drip or dislodge from their designated flight configuration such that they inhibit egress when exposed to a temperature of 500 degrees Fahrenheit (260 degrees Celsius) for five minutes.

Non-limiting examples of translucent components 14 that are formed from the composite material 70 of the present invention include, countertops 16, cabinet enclosures 18 such as wastebaskets, tray tables 20, backlit lighted signs 22 such as emergency exit signs 24, illuminating window panels 26 having light emitting diode displays 28, window bezels 30, class dividers 32, privacy partitions 34, backlit ceiling panels 36, direct lighting ceiling panels 38, lighted doors 40, lighted door latches 42, doorway linings 44, proximity lights 46, stow bin doors 48, privacy curtains 50, translucent door handles 52 (capable of changing from red to green, for example), translucent amenities cabinets 54, translucent sink decks 56 for lavatories and kitchens (with or without an appropriate under-sink enclosure 58), doorway liners 60, stow bin latch handles 62, lighted phones 64, and backlit control panels 66. While these components 14 are illustrated in one preferred arrangement, it is understood that the number, type, and location of these translucent components 14 may vary greatly among various types of commercial aircraft 10 are not meant to be limited to the illustrated arrangement.

Figures 1, 2, 3:
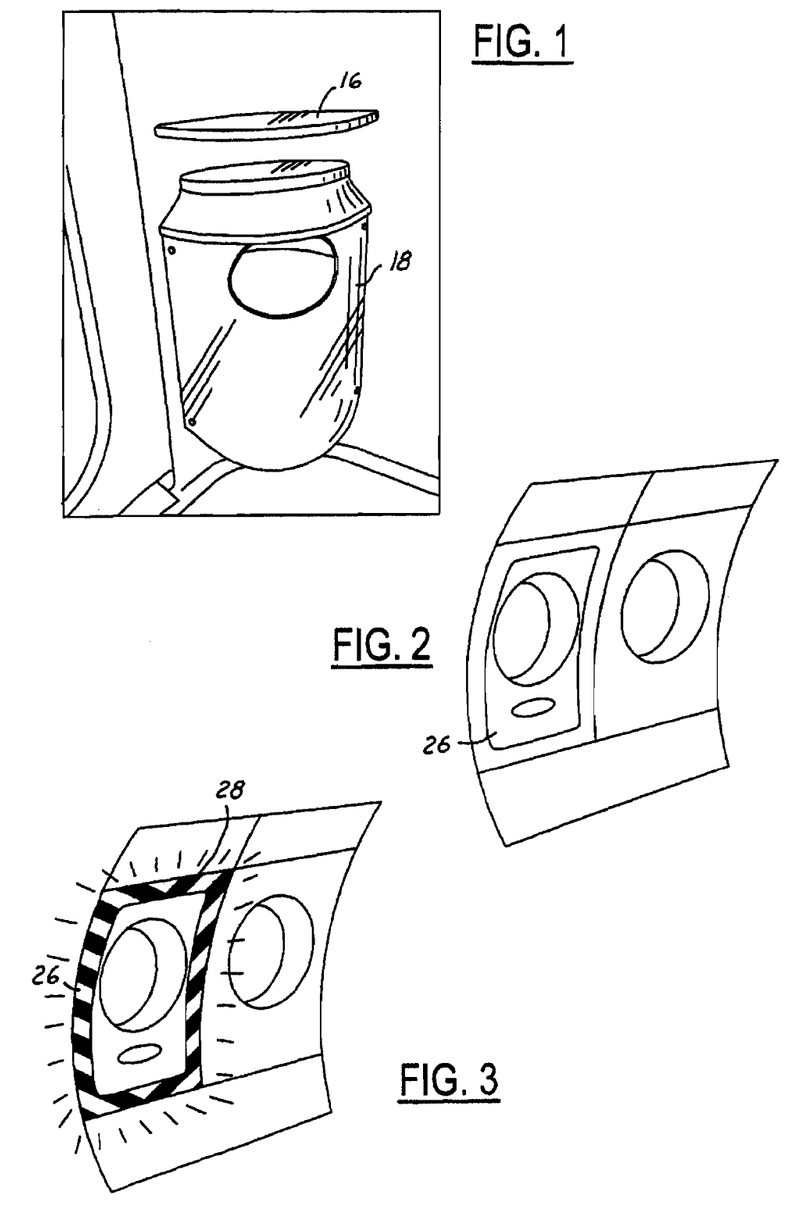
FIGS. 1-14 illustrate various perspective views of a cabin region of a commercial aircraft having translucent components formed according to the present invention.
Figure 4:
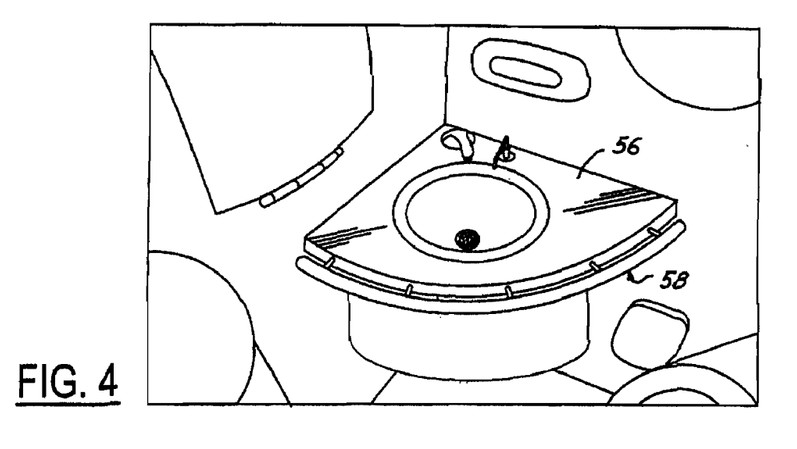
Figure 5:
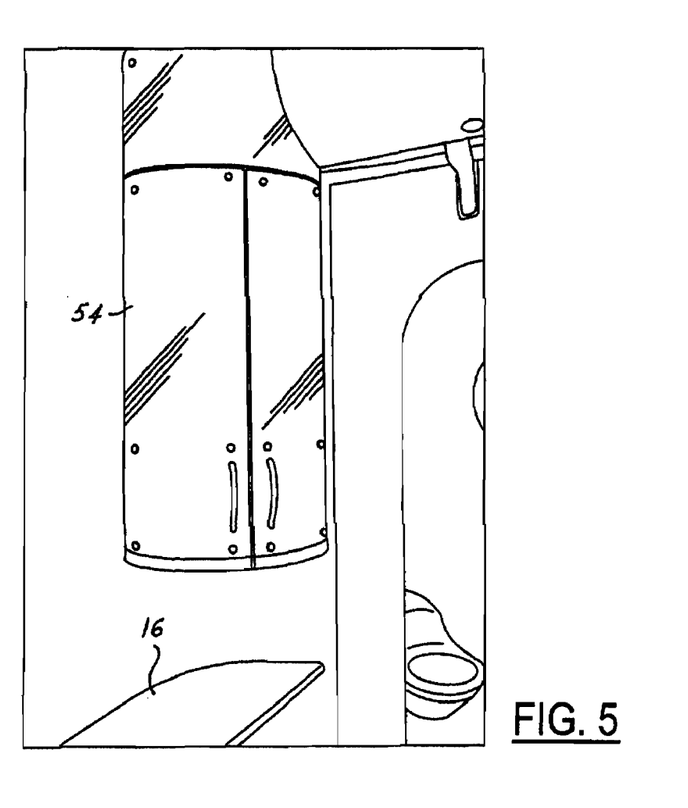
Figure 6:
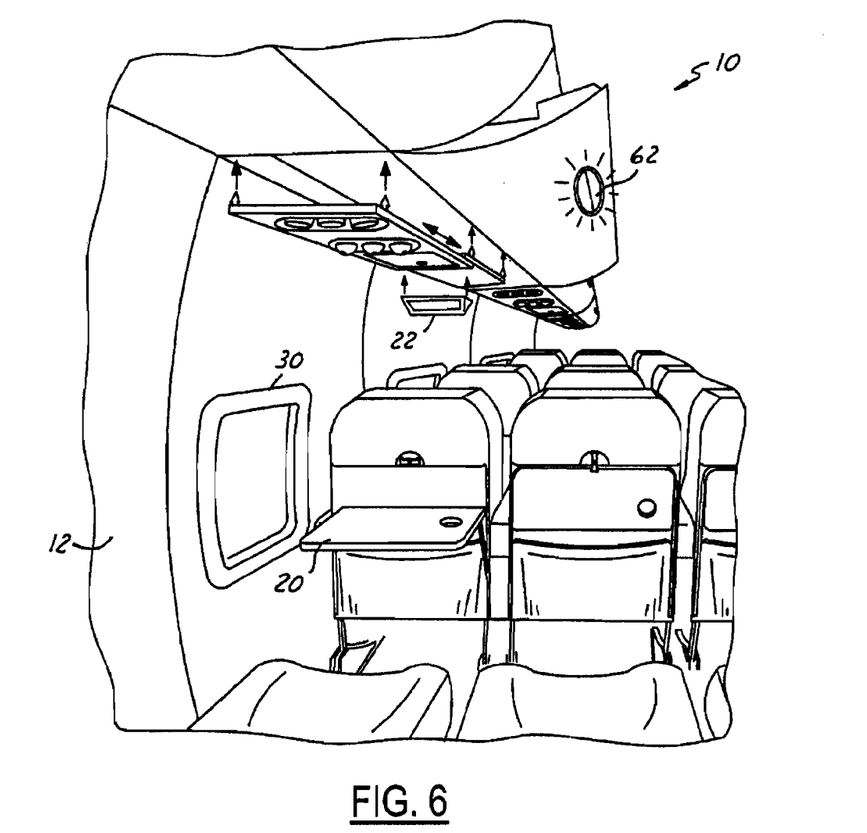
Figure 7:
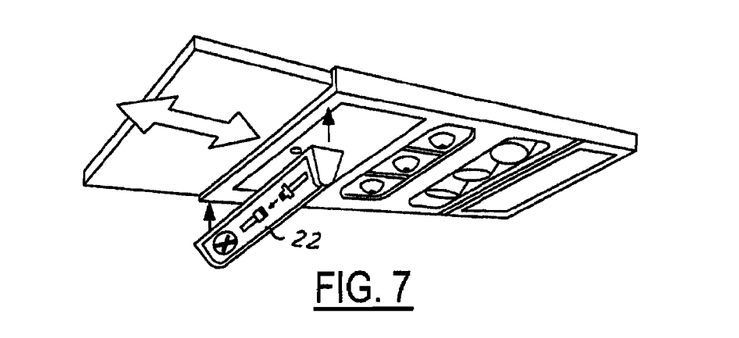
Figure 8:
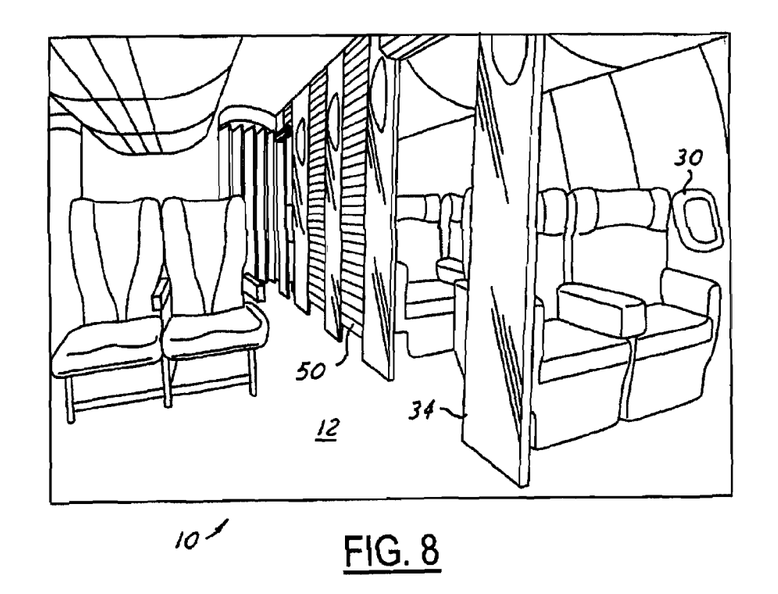
Figure 9:
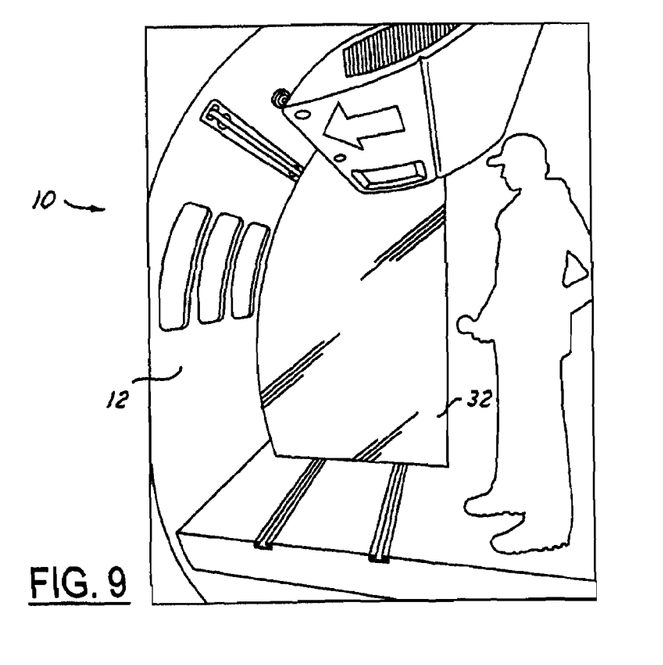
Figure 10:
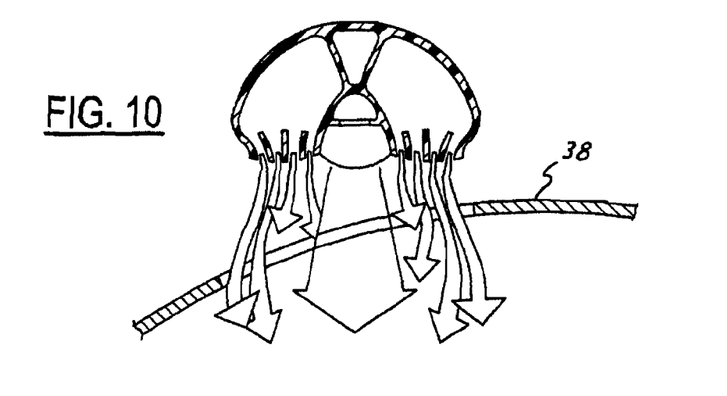
Figure 11:
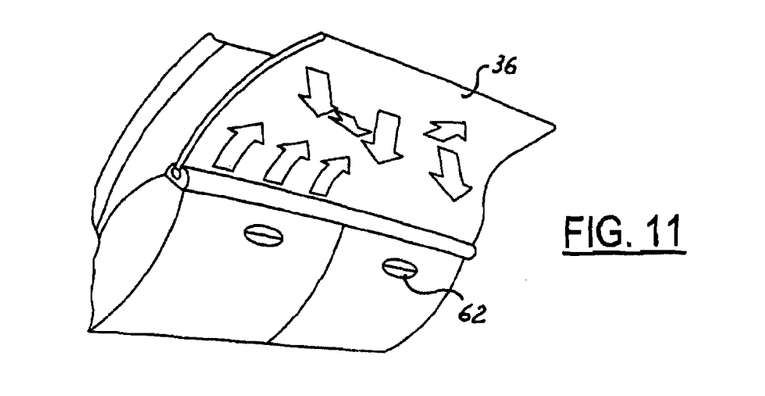
Figure 12:
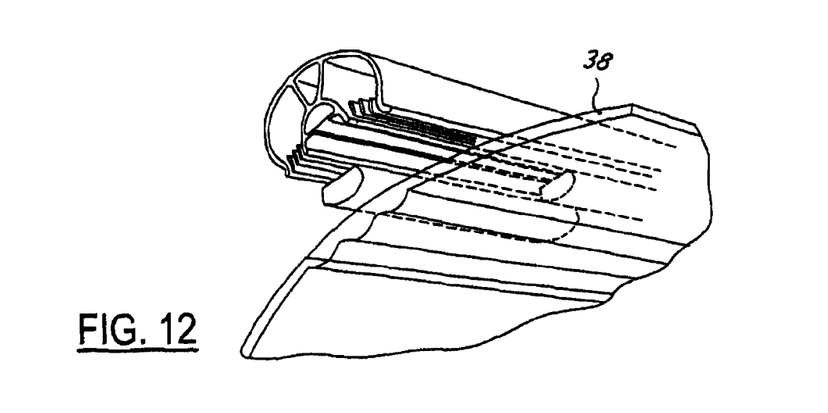
Figure 13:
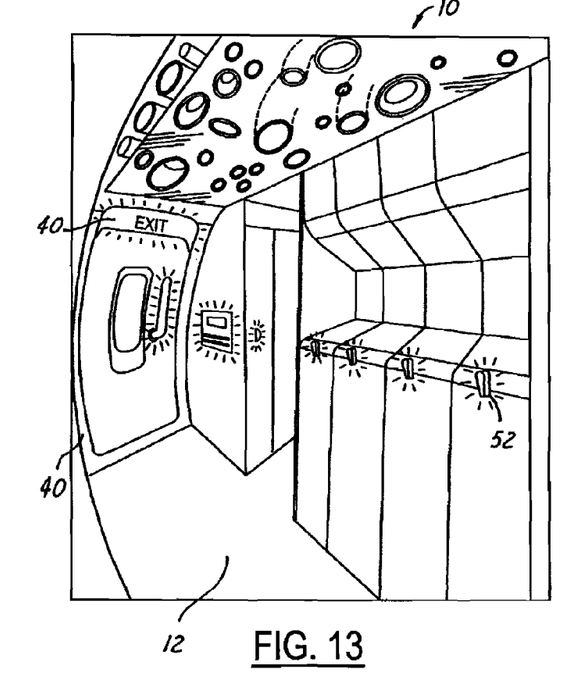
Figure 14:
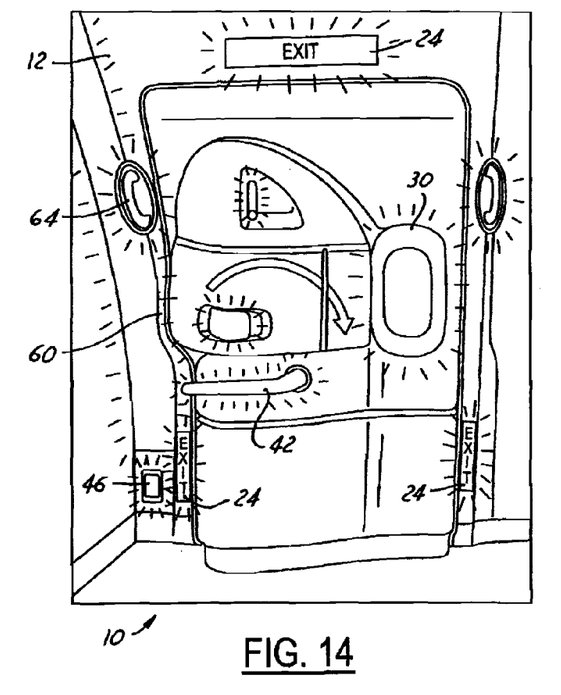
Figure 15:
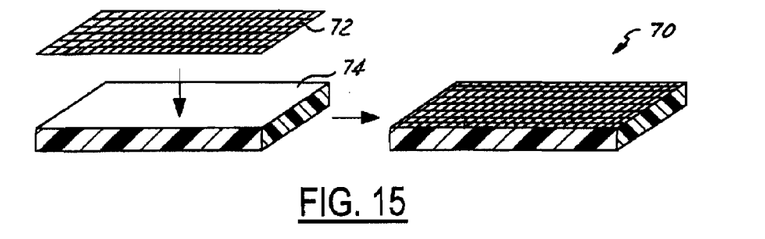
FIG. 15 is a side view a two-layer composite material having weaved fibrous material used to form the translucent components of FIGS. 1-14.
Figure 16:
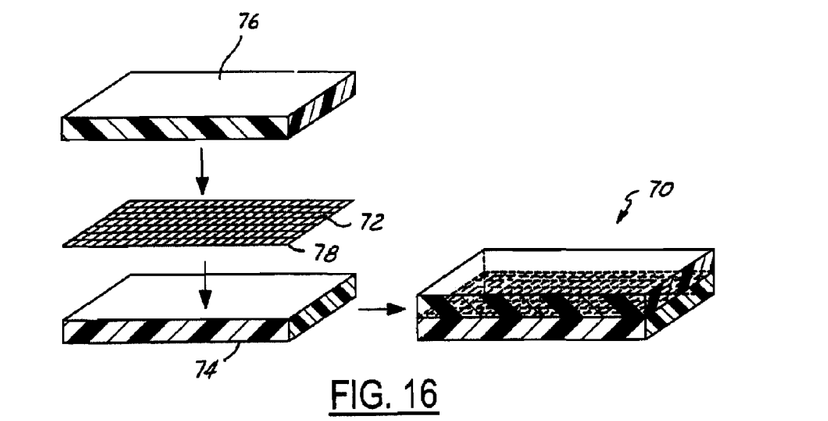
FIG. 16 a side view a three-layer composite material used to form the translucent components of FIGS. 1-14.
Figure 17:
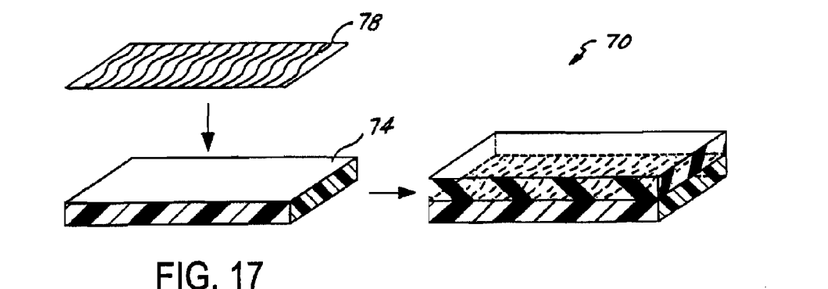
FIG. 17 a side view a two-layer composite material having unidirectional fibers used to form the translucent components of FIGS. 1-14.

FIGS. 15-17 illustrate three preferred composite materials 70 that can subsequently be post-processed to form the translucent components 14 of FIGS. 1-14. FIG. 15 illustrates a two-layer composite material, while FIG. 16 illustrates a three-layer composite material. In addition, FIG. 17 illustrates another preferred two-layer composite material utilizing a unidirectional fiberglass material. Each is described below.

Referring now to FIG. 15, a two-layer composite material 70 is formed by laminating a layer of weaved fibrous material 72 to a substrate material 74. In FIG. 16, a three-layer composite material 70 is formed by introducing second layer of substrate material 76 having the same composition as first layer 74 such that the fibrous material 72 is sandwiched and laminated between first and second layer 74, 76. In an alternative preferred embodiment, as shown in FIG. 17, a unidirectional, non-weaved fibrous material 72 is laminated to the substrate material to form another two-layer translucent composite material 70.

Of course, while three preferred embodiments are illustrated in FIGS. 15-17, other preferred embodiments are specifically contemplated. For instance, one three-layer composite material 70 consists of a weaved fibrous material 72 sandwiched between and laminated to the first layer 74 and second layer 76 as in FIG. 16. Also, two layers of fibrous material 72 (weaved or unidirectional) could be introduced to a top and bottom surface of the substrate material 74 to form another composite material 70.

The substrate material 74 is chosen based on the application for which it is utilized. In the case of airplane interior components 14, the substrate material 74 is chosen to allow adequate light transmissivity for the desired component. The substrate material 74 has the ability to soften to permit lamination of the fibrous material 72 as well as being able to be post processed to form a translucent component 14 having a desired shape and thickness. It is also desirable that the substrate material 74 is low cost, durable, and is available in varying thickness to provide design flexibility. Additionally, the substrate material 74 should be compatible with the fibrous material 72 and resist degradation due to light, heat, and stress.

One thermoplastic resin that meets these requirements is polyphenylsulfone, otherwise known as PPSU. PPSU is a translucent thermoplastic material typically that is relatively light transmissive and typically has a light brown tint. As one of ordinary skill appreciates, many grades of PPSU are commercially available, each having slightly varying transmissivity and flammability resistant properties. One preferred PPSU material is Radel PPSU, available from Solvay Advanced Polymers, LLC.

The fibrous material 72 is added to the PPSU substrate 74, 76 material to provide retention of the composite panel 60 in the event of fire. The fibrous material 72 laminated within the substrate or substrates 74, 76 allows compliance with the FAA certification requirement for flammability resistance properties, including heat release, vertical burn, smoke emissions tests, and toxic fume emissions tests. Long glass fibers 78 are preferred for use as the fibrous material 72, 70 due to their ability to act as thermal insulators, their ability to allow the substrate 70 to pass flammability tests, their ability to not overly decrease light transmissivity, and their overall appearance within the PPSU substrate 74, 76.

The long glass fibers 78 utilized should have a thread count that is coarse enough to allow sufficient light trans-mission between the fibers 78 and through the substrate 74, 76. Also, there should be sufficient volume of fibers 78 in the fibrous material 72, 70 to produce a thermal insulation capacity necessary to achieve the minimum flammability properties. Further, visible fibers 78 in the composite material 70 should have a consistent appearance. Additionally, sufficient density of fibers 78 should be present to ensure article retention.

Preferably, the long glass fibers 78 have melting temperatures substantially above the melting temperature of the PPSU substrate 74. Preferably, the glass fibers are able to support the PPSU substrate 74 once the PPSU substrate 74 is softened at about 500 degrees Fahrenheit. Two types of glass fibers 78 that meet these criteria are e-glass and s-glass fibers.

The fiber 78 density, thickness, and orientation are all properties that may be optimized for a particular application. A higher density of fibers 78, or thicker fibers 78, within the PPSU substrate 74 will provide additional strength and will act as a heat sink when exposed to fire while adversely affecting light transmissivity and overall weight. A particular fiber orientation, or fiber weave, may also affect weight, flammability, overhead fire retention, material strength, and light transmission. Thus, if more light transmission is desired, such as in an backlit light sign 22 or emergency exit sign, the fiber density, thickness, and orientation will be set to allow maximum transmissivity while maintaining the 65/65 standard. With tray tables 20, the density of glass fiber, for example, may be increased compared to backlit light signs 22, as transmissivity of light is not necessary.

The composite material 70 may be formed by many different and unique methods. Two preferred methods for forming the composite material 70 are the thermal pressing process and the continuous fiber impregnation process. Each is described below with respect to the two-layer composite material 70 of FIG. 15. However, as one of ordinary skill recognizes, the same preferred processes may be manipulated slightly to form the three-layer composite material 70 of FIG. 16 or the two-layer composite material 70 having unidirectional fibers 78 as in FIG. 17.

In the thermal pressing process, the substrate material 74 and fibrous material 72 are first introduced within a mold. The mold is first heated under controlled pressure to soften the substrate material 74. This is known as the preheating stage. Next, in the impregnation stage, higher heat and pressure are introduced to laminate the fibrous material 72 to the substrate material 74. The higher heat and pressure allows the impregnation of the embedded glass fibers 78 and substantially encapsulates the fibers 78 with the PPSU substrate material 74, therein forming the composite material 70. Finally, in the cooling stage, the composite material is cooled under controlled heat and pressure conditions to control internal stresses and warpage.

In one preferred example of this process, a composite sheet 60 of about 0.1 inches in thickness is formed by first introducing the PPSU substrate material 74 and fibrous material 72 to a mold. Next, in the preheating stage, the mold is heated to about 535 degrees Fahrenheit over about 15 minutes.

The mold is then held at 535 degrees for about 55 minutes at during the impregnation stage. During this time, the pressure is ratcheted upward slowly to prevent outgassing of the PPSU substrate material, therein preventing bubbles formed within the composite sheet 70. Thus, between 0 and 5 minutes, the pressure is maintained at about 15 pounds per square inch part pressure. Between 5 and 27 minutes, the pressure is maintained at about 50 pounds per square inch part pressure. Between 27 and 47 minutes, the pressure is maintained at about 100 pounds per square inch part pressure. Finally, between 47 and 55 minutes, the pressure is maintained at about 200 pounds per square inch part pressure.

Next, in the cooling stage, the composite part is allowed to slowly cool down to 235 degrees Fahrenheit under constant pressure of about 200 pounds per square inch part pressure. The cooling rate is maintained at about 5 degrees Fahrenheit per minute, thus this portion of the cooling stage lasts approximately one hour to control internal stresses and warpage of the forming composite part.

Next, to further cool the composite part, the temperature within the mold is slowly decreased to about 150 degrees Fahrenheit and 100 pounds per square inch part pressure to further control internal stresses and warpage. Finally, the mold is opened and the composite sheet 70 is allowed to cool to room temperature.

The thermal pressing technique has many benefits over other techniques used for forming composite materials. First, the fibers 78 are substantially encapsulated with the PPSU substrate material. Also, thermal pressing at a temperature below the melting point of the PPSU substrate allows sufficient flex without yield. Finally, the thermal pressing technique also allows the incorporation of decorative features into the composite material. For example, a screen print may be added to the fibers 78 prior to adding the fibers 78 to the PPSU substrate material 74.

In the continuous impregnation technique, molten PPSU resin making up the substrate material 74 is introduced from an extruder having a die set between a pair of rollers contained within a calendar roll stack. At the same time, a sheet layer of fibrous material 72 is unrolled from a roller onto the molten layer between the first set of rollers. The calendar roll stack, preferably containing three or more stainless steel calendar rolls stacked vertically, presses the fibrous material sheet layer and molten layer to a desired thickness, therein impregnating the PPSU resin within the fibrous material 72. The composite material 70 formed then is removed from the calendar rolls stack on a conveyor belt line and allowed to cool, therein forming a cooled, hardened composite sheet 70.

The continuous impregnation technique offers slightly different benefits to the thermal pressing technique. For example, because the process is continuous, the composite sheet material 70 may be formed at a quicker rate than with the thermal pressing technique. This is also cost effective. Also, the thickness of the material formed may be easily modified by adjusting the clearance gap between the respective rollers of the calendar stack. Additionally, the process also automates impregnation techniques that would otherwise have to be accomplished manually.

After the composite material 70 is formed by either of the preferred techniques described above or by any other techniques known to those of skill in the art, the composite material 70 is then available to be post-processed for the desired application. The type of post processing depends upon the component 14, and typically involves cutting, bending or thermoforming the part to a desired shape and size.

For example, a privacy curtain 50 must remain flexible, and is thus formed as a very thin composite material. Conversely, a countertop 16 must be able to support items placed upon it, and thus is formed with a thickness much greater than the privacy curtain 50.

Also, for example, the amount of light transmissivity may vary based upon the ultimate use of the component. Thus, an emergency exit sign 24 may be formed of a thin composite material 70 and with a lower fiber thread per unit area, therein allowing maximum light transmissivity. Conversely, a ceiling may be formed with minimal light trans-missivity having higher fiber thread count per unit area, therein providing maximum flammability resistance.

The component 14 is then available for use within the cabin area 12. To form the component, the composite material 70 having the desired light transmissivity and flame resistant characteristics as described above is bent, cut thermoformed or otherwise post-processed in methods well known in the art to shape and size the part to the desired configuration.

While the invention has been described in terms of preferred embodiments, it will be understood, of course, that the invention is not limited thereto since modifications may be made by those skilled in the art, particularly in light of the foregoing teachings.

The invention claimed is:

1. A method for forming a composite material for use in translucent, flame-resistant components, the method comprising:

introducing a layer of polyphenylsulfone substrate material to a mold;

introducing a fibrous material onto an entire top surface of said polyphenylsulfone substrate material within said mold, said fibrous material comprising a plurality of long glass fibers;

preheating said mold to a first temperature to soften said polyphenylsulfone substrate material, wherein preheating said mold comprises preheating said mold to about 535 degrees Fahrenheit over about 15 minutes to soften said polyphenylsulfone substrate material;

laminating said fibrous material to said polyphenylsulfone substrate material such that said plurality of long glass fibers are substantially encapsulated within said polyphenylsulfone substrate material while substantially preventing said polyphenylsulfone substrate from outgassing, wherein laminating said fibrous material to said polyphenylsulfone substrate material comprises:

holding said mold at about 535 degrees Fahrenheit for 0 minutes to about 55 minutes;

increasing a pressure of said mold at 0 minutes to about 15 pounds per square inch part pressure;

holding said mold at about 15 pounds per square inch part pressure between about 0 minutes and about 5 minutes;

increasing said pressure from about 15 pounds per square inch part pressure to about 50 pounds per square inch part pressure at 5 minutes;

holding said mold at about 50 pounds per square inch part pressure between about 5 minutes and about 27 minutes; increasing said pressure from about 50 pounds per square inch part pressure to about 100 pounds per square inch part pressure at 27 minutes;

holding said mold at about 100 pounds per square inch part pressure between about 27 minutes and about 47 minutes;

increasing said pressure from about 100 pounds per square inch part pressure to about 200 pounds per square inch part pressure at 47 minutes; and holding said mold at about 200 pounds per square inch part pressure between about 47 minutes and about 55 minutes;

cooling said mold under controlled heat and pressure to form the composite material; and removing said composite material from said mold.

2. The method of claim 1, wherein introducing a fibrous material comprises introducing a weaved glass fiber layer onto an entire top surface of said polyphenylsulfone substrate material within said mold, said weaved glass fiber layer comprising a plurality of long glass fibers.

3. The method of claim 1, wherein cooling said mold comprises:

slowly cooling said mold from about 535 degrees Fahrenheit to about 235 degrees Fahrenheit at 200 pounds per square inch part pressure at a cooling rate of about 5 degrees Fahrenheit per minute; and further cooling said mold to about 150 degrees Fahrenheit at about 100 pounds per square inch part pressure.

4. A method for forming a composite material for use in translucent, flame-resistant components, the method comprising:

introducing a first layer of a polyphenylsulfone substrate material to a mold;

introducing a fibrous material onto an entire top surface of said polyphenylsulfone substrate material within said mold, said fibrous material comprising a plurality of long glass fibers;

introducing a second layer of said polyphenylsulfone substrate material to a mold such that said fibrous material is sandwiched between said first layer and said second layer;

preheating said mold to a first temperature to soften said first layer and said second layer, wherein preheating said mold comprises preheating said mold to about 535 degrees Fahrenheit over about 15 minutes to soften said polyphenylsulfone substrate material;

laminating said fibrous material to said first layer and said second layer such that said plurality of long glass fibers are substantially encapsulated within said polyphenylsulfone substrate material while substantially preventing said first layer and said second layer from outgassing, wherein laminating said fibrous material to said polyphenylsulfone substrate material comprises:

holding said mold at about 535 degrees Fahrenheit for 0 minutes to about 55 minutes;

increasing a pressure of said mold at 0 minutes to about 15 pounds per square inch part pressure;

holding said mold at about 15 pounds per square inch part pressure between about 0 minutes and about 5 minutes;

increasing said pressure from about 15 pounds per square inch part pressure to about 50 pounds per square inch part pressure at 5 minutes;

holding said mold at about 50 pounds per square inch part pressure between about 5 minutes and about 27 minutes;

increasing said pressure from about 50 pounds per square inch part pressure to about 100 pounds per square inch part pressure at 27 minutes;

holding said mold at about 100 pounds per square inch part pressure between about 27 minutes and about 47 minutes;

increasing said pressure from about 100 pounds per square inch part pressure to about 200 pounds per square inch part pressure at 47 minutes; and holding said mold at about 200 pounds per square inch part pressure between about 47 minutes and about 55 minutes;

cooling said mold under controlled heat and pressure to form the composite material; and removing said composite material from said mold.

5. The method of claim 4, wherein cooling said mold comprises:

slowly cooling said mold from about 535 degrees Fahrenheit to about 235 degrees Fahrenheit at 200 pounds per square inch part pressure at a cooling rate of about 5 degrees Fahrenheit per minute; and further cooling said mold to about 150 degrees Fahrenheit at about 100 pounds per square inch part pressure.

6. A method for forming a translucent, flame resistant component for use in a cabin area of a commercial aircraft, the method comprising:

introducing a first layer of a polyphenylsulfone substrate material to a mold;

introducing a fibrous material onto an entire top surface of said polyphenylsulfone substrate material within said mold, said fibrous material comprising a plurality of long glass fibers;

introducing a second layer of said polyphenylsulfone substrate material to a mold such that said fibrous material is sandwiched between said first layer and said second layer;

preheating said mold to a first temperature to soften said first layer and said second layer, wherein preheating said mold comprises preheating said mold to about 535 degrees Fahrenheit over about 15 minutes to soften said polyphenylsulfone substrate material;

laminating said fibrous material to said first layer and said second layer such that said plurality of long glass fibers are substantially encapsulated within said polyphenylsulfone substrate material while substantially preventing said first layer and said second layer from outgassing, wherein laminating said fibrous material to said polyphenylsulfone substrate material comprises:

holding said mold at about 535 degrees Fahrenheit for 0 minutes to about 55 minutes;

increasing a pressure of said mold at 0 minutes to about 15 pounds per square inch part pressure;

holding said mold at about 15 pounds per square inch part pressure between about 0 minutes and about 5 minutes;

increasing said pressure from about 15 pounds per square inch part pressure to about 50 pounds per square inch part pressure at 5 minutes;

holding said mold at about 50 pounds per square inch part pressure between about 5 minutes and about 27 minutes;

increasing said pressure from about 50 pounds per square inch part pressure to about 100 pounds per square inch part pressure at 27 minutes;

holding said mold at about 100 pounds per square inch part pressure between about 27 minutes and about 47 minutes;

increasing said pressure from about 100 pounds per square inch part pressure to about 200 pounds per square inch part pressure at 47 minutes; and holding said mold at about 200 pounds per square inch part pressure between about 47 minutes and about 55 minutes;

cooling said mold under controlled heat and pressure to form the composite material; and removing a composite material from said mold, wherein said composite material has an average allowable heat release not to exceed a 65/65 standard; and post processing said composite material to form the translucent, flame resistant component.

7. The method of claim 6, wherein said translucent, flame resistant component is selected from a group consisting of a countertop, a cabinet enclosure, a tray table, a backlit lighted sign, an illuminating window panel, a window bezel, a class divider, a privacy partition, a backlit ceiling panel, a direct lighting ceiling panel, a backlit control panel, a lighted door, a lighted door latch, a doorway lining, a proximity light, a stow bin door, a privacy curtain, a translucent door handle, a translucent amenities cabinet, a translucent sink deck a doorway liner, a stow bin latch handle, and a lighted phone.

8. The method of claim 6, wherein post processing said composite material is selected from a group consisting of cutting said composite material to a desired shape and size, thermoforming said composite material to a desired shape and size and bending said composite material to a desired shape and size.

\* \* \* \* \*